US008230922B2

(12) United States Patent
Pich

(10) Patent No.: US 8,230,922 B2
(45) Date of Patent: Jul. 31, 2012

(54) ENHANCED OIL RECOVERY BY POLYMER WITHOUT SUPPLEMENTARY EQUIPMENT OR PRODUCT

(75) Inventor: René Pich, Andrezieux Boutheon (FR)

(73) Assignee: S.P.C.M. SA (FR)

( * ) Notice: Subject to any disclaimer, the term of this patent is extended or adjusted under 35 U.S.C. 154(b) by 0 days.

(21) Appl. No.: 13/163,519

(22) Filed: Jun. 17, 2011

(65) Prior Publication Data

US 2011/0240289 A1 Oct. 6, 2011

Related U.S. Application Data

(63) Continuation of application No. PCT/EP2009/064452, filed on Nov. 2, 2009.

(30) Foreign Application Priority Data

Dec. 18, 2008 (FR) ...................................... 08 58774

(51) Int. Cl.
*E21B 43/22* (2006.01)
*E21B 43/16* (2006.01)

(52) U.S. Cl. ...................... 166/270; 166/400; 166/305.1

(58) Field of Classification Search .................. None
See application file for complete search history.

(56) References Cited

U.S. PATENT DOCUMENTS

| 2,625,529 | A | * | 1/1953 | Hedrick et al. ............... 523/132 |
| 2,874,124 | A | * | 2/1959 | Vitalis .......................... 510/353 |
| 3,434,542 | A | * | 3/1969 | Dotson et al. ............... 166/270.1 |
| 3,687,199 | A | | 8/1972 | Jennings |
| 3,741,307 | A | * | 6/1973 | Sandiford et al. ............. 166/400 |
| 3,949,811 | A | * | 4/1976 | Threlkeld et al. ............. 166/294 |
| 4,182,417 | A | | 1/1980 | McDonald et al. |
| 4,231,426 | A | | 11/1980 | Carter et al. |
| 4,299,709 | A | | 11/1981 | Carter et al. |
| 4,415,033 | A | | 11/1983 | Chan et al. |
| 5,735,349 | A | | 4/1998 | Dawson et al. |
| 2003/0149212 | A1 | | 8/2003 | Chang et al. |
| 2003/0155122 | A1 | | 8/2003 | Chang et al. |

OTHER PUBLICATIONS

International Search Report; PCT/EP2009/064452; Nov. 19, 2009; 4 pages.

* cited by examiner

*Primary Examiner* — Angela M DiTrani
(74) *Attorney, Agent, or Firm* — St. Onge Steward Johnston & Reens LLC

(57) ABSTRACT

A method for enhanced oil recovery in an oil-bearing formation having high permeability zones, constituting preferential passages for the injected liquid, involves blocking the preferential passages by injecting into the formation an aqueous solution based on water soluble polymers at a concentration such that the viscosity of the aqueous solution is higher than the viscosity of the oil. Once the blocking step is completed, an aqueous solution is injected having an identical composition to that used in the blocking step, but at a lower polymer concentration.

13 Claims, No Drawings

ENHANCED OIL RECOVERY BY POLYMER WITHOUT SUPPLEMENTARY EQUIPMENT OR PRODUCT

CROSS-REFERENCE TO RELATED APPLICATIONS

The present application is a continuation of pending International patent application PCT/EP2009/064452 filed on Nov. 2, 2009 which designates the United States and claims priority from French patent application 0858774 filed on Dec. 18, 2008, the content of which is incorporated herein by reference.

FIELD OF THE INVENTION

The present invention relates to an improved method for enhanced oil recovery. It relates in particular to the use of a hydrophilic polymer solution having a very high concentration and high viscosity (viscous slug) during a limited time to improve the rate of enhanced oil recovery by polymer during the production of an oil-bearing geological formation, and without auxiliary equipment or chemical.

BACKGROUND OF THE INVENTION

Most oil fields produced today have become mature and have therefore entered the decline of their production or are on the point of doing so. The recovery rate of these fields is currently about 30 to 35% on average. Hence they still offer considerable production potential.

The crude oil contained in the reservoirs is generally recovered in several steps.

Production results first from the natural energy of the fluids and the rock which are decompressed. On completion of this depletion phase, the quantity of oil recovered at the surface accounts for an average of about 10 to 20% of the initial reserve.

It is therefore necessary, in a second step, to employ techniques aimed to increase the recovery yield.

The method most commonly used consists in injecting water, or a brine, into the reservoir via input wells dedicated for this purpose. This is referred to as secondary recovery. This latter phase stops when the water content in the mixture produced by the producing wells is too high. The gain here, in terms of additional recovery rate, is about 20%.

The effectiveness of the flushing by water injection can then be improved by reducing the mobility of the brine obtained by the addition of water-soluble polymers. This is referred to as Enhanced Oil Recovery (EOR) by polymer. This method consists in injecting, into the oil-bearing formation, a viscous polymer solution produced from a high molecular weight (MW) polymer through an input well drilled into the formation. This produces the flushing energy and action required for the remaining oil in the formation to be expelled more uniformly into neighbouring producing wells. The efficiency of such a recovery method varies with the heterogeneity of the formation, that is with the variations in permeability of the formation, and the viscosity of the oil to be displaced.

Polymer EOR was developed in the USA in the 1970s. However, due to the drop in oil prices in the 1980s, most of the projects were abandoned. Accordingly, U.S. Pat. No. 3,687,199 discloses a method using a low amount of polymer. The method consists in injecting an initial slug of an aqueous medium containing a polymer having a low viscosity regarding the viscosity of the oil (see example 1) and then, in injecting a second slug containing a decreased polymer concentration. Such a process can not be used industrially. In the early 1990s, the Daqing field in China demonstrated that it was a good candidate for polymer injection, and SNF was selected for engineering and construction of a 55 000 tonne polyacrylamide plant. Whereas the oil recovery of Daqing with brine injection alone was 40% on average, the same recovery was raised on average to 52% by polymer injection.

Simultaneously, the use of surfactants for enhanced oil recovery has also been abundantly described. Many types of surfactants have been proposed for enhanced oil recovery. The most commonly used surfactants, for reasons of cost and stability, are of the sulphonate type. Their use has the role of decreasing the interfacial tension between the water and the oil and thereby promoting the emulsification of the oil in the aqueous phase. However, the quantities of surfactants required to effectively "solubilize" the oil in place are very high (proportion of 5000 to 15 000 ppm by mass of the injected brine), making the project economically unviable). A method of this type is disclosed in U.S. Pat. Nos. 4,231,426 and 4,299,709 wherein the amount of surfactant fluid which must be employed is determined by using a tracer.

To overcome this major drawback, a technique called ASP (Alkali/Surfactant/Polymer) has been developed. It requires the use of caustic soda or sodium carbonate, usually combined with water-soluble polymers, in order to lower the surfactant concentrations used (by about 1000 to 5000 ppm). However, this technique requires purification of the injection water, implying major industrial problems. This is because the divalent ions present in the injection brines react with the alkalis to form precipitates and must therefore be removed from the injection water to avoid any clogging of the reservoir. These problems explain in particular why the development of ASP at Daqing has been held back. However, these tests have proved that the recovery rate could be increased by at least 20% for a water cut (percentage of production water with regard to the oil produced) of 98%.

Finally, tests have been conducted by permanently (that is continuously) increasing the polymer concentration (SPE 101202) but the productivities obtained proved to be low due to the loss of injectivity, while demonstrating that in the very long term, an additional recovery rate similar to that of ASP could be obtained.

Conventionally, the increase in production by polymer injection has been explained by the increase in the volume flushed and not by an improvement in efficiency per unit volume. However, when very high molecular weight (MW>18 million) polymers are used, the results observed in the laboratory on cores (showing that the microscopic displacement of the oil was improved) failed to be confirmed in the field. This can be explained by the viscoelasticity of the polymer.

This is explained by the fact that the core tests use definite non-degraded polymers, whereas the polymer in the field undergoes considerable changes, which are normally not reproduced in the laboratory. Since 1995, SNF has analyzed these modifications on numerous samples of water produced in EOR projects. The results obtained show that the degradation of the polymer in the field can sometimes be extremely high, thereby confirming that the core tests only allow a partial investigation, concerned exclusively with injectivity.

On the Daqing or Shengli fields in China, where the polymer is injected without removing oxygen, a very high degradation is observed:

by free radicals: when the injected solution contains oxygen, it reacts with the oxygen inhibitor (ammonium hydrosulphite), iron, hydrogen sulphide, by creating free radicals which, by chain reactions, destroy the molecular weight, and achieve this in a few hours or in only a few days after injection. The degradation is greater with higher molecular weight;

due to the mechanical stresses: the polymer, at the time of injection, undergoes high acceleration, up to 5 to 20 m/sec both due to the low injection area and the reduction thereof over time: sands, clays, rusts, hard gels (non-degradable crosslinked polymers), or by mechanical equipment (nozzles). The rate of instantaneous passage can sharply degrade the polymer, particularly if its molecular weight is high;

due to a chemical degradation, with the effect of increased hydrolysis of certain functions of the polymer and the possibility of precipitation particularly in the presence of $Ca^{2+}$, which causes a decrease in concentration and viscosity.

Thus, particularly when the field injection conditions are not optimal, the following can be observed, in comparison with the laboratory tests:

a drop in viscosity of the injection fluid by a factor of 5 to 20, a reduction in the molecular weight of the polymer by a factor of 3 to 20, a drop in concentration by precipitation or dilution by a factor of 2 to 5.

For this purpose, SNF has developed and patented practical solutions to reduce these negative effects:

specialized equipment to dissolve the polymer with low shear at high concentration under nitrogen in order to reduce the injection to a minimum of oxygen, the effective use of a minimum of oxygen reducer for reducing the formation of free radicals, the use of free radical absorbers which prevent them from destroying the polymer by chain reaction, the production of polymers not having hard non-injectable gels and minimum quantities of soft gels, that is injectable at low pressure, control of the iron in the water used, control of the hydrolysis rate distribution by using methods of copolymerization and not of co-hydrolysis or of post-hydrolysis which promote precipitation in the field, the adjustment of the hydrolysis rate, particularly at the temperature of the field, to avoid or limit its precipitation, the introduction of functional monomers less sensitive to hydrolysis and to precipitation.

Similarly, to limit the impact of the degradations on the polymer, studies have demonstrated that an optimum molecular weight exists, often located between 12 and 18 million depending on the field, its temperature, its salinity, its permeability, its injection conditions, which serves to offer the best cost-benefit ratio.

Despite all these precautions, it must be considered that the degradation of the molecular weight will be about 5 to 20%, requiring an over concentration at injection, and also that the dilution in the reservoir is specific to it.

However, contrary to what was tested at Daqing (SPE 101202), a very high degradation can only be offset by simply increasing the polymer concentration in the injection water, because doing so clashes with problems of injectivity (injection capacity) when this concentration is increased by a factor of 2 or more. Hence physical impossibilities exist which must be surmounted to obtain a suitable flow rate per well.

In addition to the problems caused by polymer degradation, the main problem arising for obtaining effective recovery was based on the fact that there is practically no existing oil-bearing formation which has a uniform permeability. On the contrary, typical oil-bearing formations comprise multiple layers of rocks having different permeabilities and porosities ranging from 1 to 30 000 millidarcies (with porosities of 5 to 30% for example) and creating very different pressure drops according to the liquids (brine, oil, aquifer water, etc.). In such circumstances, it is clear that a displacement medium tends selectively to follow the path of least resistance, for example a high impermeability zone, and to infiltrate therein rapidly while circumventing the oil. In these adverse conditions, the producing wells rapidly supply a quantity of displacement medium that is so high, compared to the oil, that the enhanced oil recovery method ceases to be profitable.

The solutions adopted to modify the profile and reduce the preferential passages are:

A. The water shut-off in which the injection of a polymer and a crosslinking agent serve to create a gel in priority in these preferential passages. However, many water shut-offs have failed either due to the lack of any effect or by blocking the injection, which must then be resolved by chemical degradation of the polymer. A method of this type is disclosed in U.S. Pat. No. 3,741, 307A wherein a liquid agent as silica is injected in the reservoir to form a plugging material that reduces the permeability of the formation B. The injection of crosslinked polymers of which the viscosity increases in the reservoir with time:

Dow (U.S. Pat. No. 4,182,417) which injects a viscous crosslinked polyacrylamide emulsion.

BJ with the injection of a crosslinked emulsion in a brine which decreases its viscosity and which achieves its effect by dilution in the field (U.S. Pat. No. 5,735, 349).

BJ with the injection of a double crosslinked emulsion (stable and labile) in a hydrocarbon which obtains its viscosity by hydrolysis (U.S. Pat. No. 5,466,792).

Nalco (US 2003-149212 & US 2003-155122) by injection, in suspension in water, of an emulsion of double-crosslinked polyacrylamide (stable and labile) which becomes viscous by hydrolysis at the field temperature or by injection of a base.

However, the installation of these processes requires the use of extensive and specific resources, which are only decided as a last resort. Moreover, the number of polymer input wells (several thousands on certain fields) requires both simple and inexpensive solutions. Current profile modification methods are unable to achieve this purpose.

U.S. Pat. No. 4,415,033A discloses a method of oil recovery consisting in introducing into the formation a micellar fluid containing surfactants and then a mobility control fluid containing the polymer. The viscosity of the fluids which are injected are graded from a low viscosity at the front thereof to a higher viscosity at the rear thereof, thus preventing the formation of viscous zones within the injected fluids due to the interference of the polymer and the surfactant.

The present invention overcomes all the drawbacks described above and in particular is designed to reduce the preferential passages, while using low quantities of polymer and with high production rates.

SUMMARY OF THE INVENTION

The present invention relates to a novel and extremely effective continuous method for enhanced oil recovery. It has been found, surprisingly, that it is possible to maintain the quality of the drive fluid for enhanced oil recovery:

first by injecting a viscous slug, having a higher viscosity than the oil in place, in the high permeability zones, which means injecting a slug containing a polymer which concentration increases until reaching a viscosity which is higher than that of the oil inside the reservoir, then, once the preferential passage has been treated, by reducing the viscosity of the drive fluid injected to the normal, which means reducing progressively the concentration of the polymer until reaching the initial viscosity serving to return to the initial production rates.

More precisely, it is the object of the invention to block the preferential passages of the water present in the oil-bearing formation by injecting the polymer at a higher viscosity than the oil, that is by injecting a viscous slug to modify the profile. Thus, the viscous slug fills the high permeability zone invaded by the water and proportionally decreases the rate of passage. The restoration of the initial viscosity at injection serves to return to the initial production rates, but with a much higher "oil-cut" (oil/water ratio). The ancillary effect is to reduce the quantity of polymer required per barrel of oil produced.

In other words, the invention relates to a method for enhanced oil recovery in an oil-bearing formation having high permeability zones constituting preferential passages for the injected liquid consisting in:
  a) optionally determining the volume of preferential passages to be treated,
  b) treating the preferential passages by injection into the formation of, advantageously a corresponding volume, of an aqueous solution based on water soluble polymers at a concentration such that the viscosity of the aqueous solution is higher than that of the oil (viscous slug),
  c) once step b) is completed, an aqueous solution is injected having an identical composition to that used in b) at a lower polymer concentration.

According to a first embodiment of the invention, to determine the volume of preferential passages to be treated:
  at time T1, an aqueous solution containing a tracer is injected into the oil-bearing formation,
  the quantity of aqueous solution injected is then measured until the appearance of the tracer at time T2 in the production water by multiplying the injection rate by the difference between T2 and T1.

According to a second embodiment of the invention, to determine the volume of preferential passages to be treated:
  at time T1, an aqueous solution of polymer containing a tracer is injected into the oil-bearing formation,
  the quantity of aqueous solution injected is then measured until the appearance of the tracer at time T2 in the production water by multiplying the injection rate by the difference between T2 and T1.

In the second embodiment, the polymer present in the aqueous solution containing the tracer is identical to the polymer present in the injection solution intended for treating the preferential passages. Advantageously, the polymer concentration present in the aqueous solution containing the tracer is relatively lower than the polymer concentration present in the injection solution intended for treating the preferential passages.

According to another feature, the polymer concentration present in the aqueous solution containing the tracer is identical to the polymer concentration injected in solution on completion of step b).

DETAILED DESCRIPTION OF THE INVENTION

More precisely, the steps of the method are the following in practice:
STEP 1 (Analysis): Prior determination of the presence of polymer in the production water and/or of a tracer or a substantial increase in the water cut. This step serves to check the possible existence of preferential passages and of the excess polymer to be injected due to its degradation.

STEP 2 (Analysis): When the existence of preferential passage(s) is validated, the time of passage of the drive fluid in the high permeability zones is determined. This measurement is taken using a tracer (generally iodine) which is injected into the input well, the time required to recover its trace in the well production water is then determined. It then suffices to convert this time into injected volume (V) (flow rate×time), the volume thus measured corresponding to the volume to be treated.

STEP 3 (Injection): A volume similar to volume V of the viscous slug is then injected into the formation, taking account if possible of the degradation of the polymer. The term viscous slug means a drive fluid having a viscosity higher than the oil in place at the propagation rates with a safety factor of about 10 to 30%. Due to the displacement of the oil during this period, additional quantities can be injected with regard to the volume V determined.

More precisely, to obtain this concentration, the dilution of the polymer solution is progressively reduced while maintaining the injection pressure by the volume injected to avoid fracturing the formation. This is carried out only by changing the injection parameters on auxiliary equipment or product on the control panel.

This injection at high concentration may last, according to V, between 1 and 5 weeks in difficult cases.

STEP 4 (Injection): Once the volume V of the viscous slug has been injected, the dilution is slowly increased to resume the normal polymer injection while checking the injection pressure.

According to the invention, the water-soluble polymers used do not require the development of a particular polymerization process. They can be obtained by any polymerization techniques well known to a person skilled in the art (solution polymerization, gel polymerization, precipitation polymerization, emulsion polymerization (aqueous or inverse) followed or not by a spray drying step, suspension polymerization, micellar polymerization followed or not by a precipitation step.

In practice, the polymer used consists of:
  a) at least one monomer selected from the nonionic monomers: acrylamide, methacrylamide, N-vinyl pyrrolidone, vinylacetate, vinyl alcohol, acrylate esters, allyl alcohol, N-vinyl acetamide, N-vinylformamide,
  b) and optionally one or more ionic monomers selected from anionic monomers having a carboxylic function (e.g.: acrylic acid, methacrylic acid, and salts thereof) or having a sulphonic acid function (e.g.: 2-acrylamido-2-methylpropane sulphonic acid (ATBS) and salts thereof).

The polymer can be linear, branched, associative, comb, block, etc. . . . but in any case water soluble.

In practice, the polymer has a molecular weight higher than 5 million g/mol, advantageously, higher than 8 million g/mol, particularly for treating preferential passages with permeability higher than 500 millidarcies.

Preferably, the polymers are water-soluble, anionic based on acrylamide, and have a molecular weight generally between 8 and 30 million g/mol. The anionicity results from a copolymerization, co-hydrolysis or post-hydrolysis process.

According to the invention, the polymer concentration present in the aqueous solution containing the tracer varies between 500 and 3000 ppm by mass.

Similarly, the polymer concentration in the viscous slug varies between 1000 ppm and 10 000 ppm by mass.

According to the invention, the tracers used do not require any particular development. They are generally well known to a person skilled in the art and may be:
- of the dye type, by colour comparison, selected from derivatives of fluorescein or uranine,
- the radioactive isotope type, selected from $Na^{24}$, $Ca^{47}$, $J^{131}$, caesium, tritium,
- the saline type, by microchemical measurement, selected from sodium or potassium iodide, potassium chloride, zinc or copper sulphate.

Treatment method according to the invention may be carried out once or repeated if the oil concentration in the production water begins to decrease.

The improved enhanced oil recovery method according to the invention serves to increase the proportion of oil in the water produced by a factor of between 2 and 10.

Furthermore, it has been found that the implementation of the invention, in addition to increasing the production rate and the total production of a field, also serves to decrease the quantity of polymer required per barrel of oil produced, which constitutes a spectacular breakthrough compared with existing processes.

The invention will now be illustrated more completely with the help of non-limiting examples and in particular which cannot be considered as limiting for the compositions and forms of the polymers.

EXAMPLE

The reservoir selected has the following features:
Pressure: 100 bar
Temperature: 45° C.
Salinity: 5000 ppm TDS
Oil viscosity: 25 cps
Water viscosity: 0.6 cps
Vertical/Horizontal permeability (Kv/Kh): 01
$S_{wir}$ "Irreducible Water Saturation": Proportion of water present in the well: 0.25
$S_{or}$ "Residual Oil Saturation": Proportion of non-recoverable oil in the well: 0.30
The operating scheme is as follows:
Injection rate 200 m³/h.
The downhole pressure is maintained below the fracturing pressure of 170 bar.
Start of production 80 m³/day per well.
This start can be adjusted to maintain the minimum downhole pressure of the producing well at 10 bar. The polymer injected is an acrylamide/sodium acrylate copolymer having a molecular weight of 15 million.
It is dissolved in stock solution by the use of a PSU (WO 2008/107492) under nitrogen containing less than 200 ppm oxygen at a concentration of 10 g/liter, with an initial oxygen concentration of 20 ppb.
It is then diluted by a treated production water containing 10 ppb oxygen.
This stock solution is diluted to 800 ppm giving a Brookfield UL 6 rpm viscosity of 19 cps and a zero-rate viscosity (Bohlin Gemini) of 35 cps.
The field was previously treated by water injection to an oil-in-water concentration of 4% with a calculated theoretical recovery at 2% oil of 24.3%.
A polymer solution containing 800 ppm was then injected for 3 years up to an oil concentration of 7% yielding by calculation a recovery of 32.5% at 2% oil.

An iodine tracer was injected, and is found in the production water at 17 days and an injected volume of 3400 m³.
The polymer produced has a molecular weight of 12.5 million.
With these details, it was decided to increase the polymer concentration to 1200 ppm to obtain a Brookfield UL 6 rpm viscosity of 35 cps and a zero-rate viscosity (Bohlin Gemini) of 70 cps to take account both of the degradation and dilution.
The water flow rate was progressively decreased while maintaining the injection pressure and the equilibrium was reached for 1200 ppm of polymer at a flow rate of 130 m³/day.
This flow rate was maintained for 26 days.
The water and polymer flow rates were then restored while monitoring the injection pressure for 8 days.
The proportion of oil in the production water rose to 26% and the calculation shows that recovery at the final concentration of 2% is about 44%.
The consumption of polymer with regard to oil produced was decreased by a factor of more than 3 over a period of 2 years.
The use of this method requires no modification of the surface equipment and no new chemical.
This substitutes for the permanent and massive increase in the consumption of polymer which was selected as the solution in the case of very high field degradations.

What is claimed is:

1. A method for enhanced oil recovery in an oil-bearing formation having high permeability zones constituting preferential passages for injected liquid, said method comprising the steps of:
    a) blocking the preferential passages by injecting into the formation an aqueous solution based on water soluble polymers at a concentration such that a viscosity of the aqueous solution is higher than a viscosity of the oil, and
    b) injecting, once step a) is completed, an aqueous solution having an identical composition as the aqueous solution injected in step a), but having a lower polymer concentration.

2. The method according to claim 1, further comprising, before said step of blocking the preferential passages, the step of determining a volume of preferential passages to be blocked.

3. The method according to claim 2, wherein said step of determining the volume of preferential passages to be blocked comprises the step of:
    injecting, beginning at time T1, an aqueous solution of polymer containing a tracer into the oil bearing formation, and
    measuring a quantity of aqueous solution injected until the appearance of the tracer at time T2 in the production water by multiplying an injection rate by a difference between T2 and T1.

4. The method according to claim 3, wherein the polymer present in the aqueous solution containing the tracer is identical to the polymer present in the injection solution for blocking the preferential passages.

5. The method according to claim 3, wherein the injection of the aqueous solution based on polymers for blocking the preferential passages is carried out by progressively reducing a dilution of the aqueous polymer solution containing the tracer while preserving a substantially constant injection pressure.

6. The method according to claim 3, wherein a polymer concentration of the aqueous polymer solution containing a tracer is between 500 and 3000 ppm by mass.

7. The method of claim 3, wherein the tracer is selected from the group consisting of:
   dye tracers, selected from the group consisting of derivatives of fluorescein or uranine,
   radioactive isotope tracers, selected from the group consisting of Na24 Ca47, J131, caesium and tritium, and
   saline tracers, selected from the group consisting of sodium or potassium iodide, potassium chloride, zinc or copper sulphate.

8. The method according to claim 1, wherein the injection of the aqueous solution on completion of step a) is carried out by dilution of the injection solution intended for blocking the preferential passages, while preserving a substantially constant injection pressure.

9. The method according to claim 1, wherein a polymer concentration of the aqueous solution for blocking the preferential passages is between 1000 and 10000 ppm by mass.

10. The method according to claim 1, wherein the polymer has a molecular weight above 5 million g/mol.

11. The method according to claim 1, wherein the polymer comprises:
   at least one monomer selected from the following nonionic monomers: acrylamide, methacrylamide, N-vinyl pyrrolidone, vinylacetate, vinyl alcohol, acrylate esters, allyl alcohol, N-vinyl acetamide, N-vinylformamide.

12. The method according to claim 11, wherein the polymer further comprises:
   one or more ionic monomers selected from the following anionic monomers having a carboxylic function: acrylic acid, methacrylic acid, and salts thereof.

13. The method according to claim 11, wherein the polymer further comprises:
   one or more ionic monomers selected from the following anionic monomers having a sulphonic acid function: 2-acrylamido-2-methylpropane sulphonic acid (ATBS) and salts thereof.

* * * * *